(12) United States Patent
Benesch et al.

(10) Patent No.: US 10,749,445 B2
(45) Date of Patent: Aug. 18, 2020

(54) REGULATION OF AN OUTPUT CURRENT OF A CONVERTER

(71) Applicant: SIEMENS AKTIENGESELLSCHAFT, München (DE)

(72) Inventors: Norbert Benesch, Heroldsberg (DE); Bernd Dressel, Burgebrach (DE); Maximilian Schmitt, Eltmann (DE); Harald Wiessmann, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/463,708

(22) PCT Filed: Oct. 18, 2017

(86) PCT No.: PCT/EP2017/076540
§ 371 (c)(1),
(2) Date: May 23, 2019

(87) PCT Pub. No.: WO2018/095659
PCT Pub. Date: May 31, 2018

(65) Prior Publication Data
US 2019/0326833 A1    Oct. 24, 2019

(30) Foreign Application Priority Data
Nov. 24, 2016 (EP) ..................................... 16200539

(51) Int. Cl.
*H02M 7/538* (2007.01)
*H02M 7/5387* (2007.01)
(Continued)

(52) U.S. Cl.
CPC ............ *H02M 7/5387* (2013.01); *G05F 1/12* (2013.01); *H02M 1/12* (2013.01)

(58) Field of Classification Search
CPC ...... H02M 7/538; H02M 7/5387; H02M 1/08; H02M 1/12; G05F 1/12
(Continued)

(56) References Cited

U.S. PATENT DOCUMENTS 7,773,400 B2 *   8/2010  Nakamori  ...............  H02M 1/08
                                                 323/283
8,907,647 B2 *  12/2014  Nakagawa  ........  H02M 7/53871
                                                 323/222
(Continued)

OTHER PUBLICATIONS

Hofmann Martin et al: Optimization of direct current controlled multilevel inverters under distorted conditions, 2016 18th European Conference on Power Electronics and Applications (EPE'16 ECCE Europe), Jointly Owned by IEEE-PELS and EPE Association, pp. 1-7, XP032985173, DOI: 10.1109/EPE.2016.7695466; [gefunden am Dec. 25, 2016]; das ganze Dokument; 2016.
(Continued)

*Primary Examiner* — Yemane Mehari
(74) *Attorney, Agent, or Firm* — Henry M. Feiereisen LLC

(57) ABSTRACT

A method for regulating an AC output current of a converter having a DC voltage intermediate circuit and a semiconductor switch in a bridge circuit for converting a DC voltage of the DC voltage intermediate circuit into an AC output current. The AC output current is regulated by way of a direct hysteresis current regulation, in which an actual value of the AC output current is maintained within a hysteresis window around a set point value. Furthermore, a hysteresis width of the hysteresis window is modulated in order to adjust a frequency spectrum of the AC output current.

14 Claims, 10 Drawing Sheets

(51) Int. Cl.
*G05F 1/12* (2006.01)
*H02M 1/12* (2006.01)

(58) Field of Classification Search
USPC .................................................. 323/282–285
See application file for complete search history.

(56) References Cited

U.S. PATENT DOCUMENTS

| | | | |
|---|---|---|---|
| 2004/0080966 A1 | 4/2004 | Chadwick | |
| 2008/0094121 A1* | 4/2008 | Nakamori | H02M 1/08 327/393 |
| 2009/0212733 A1* | 8/2009 | Hsieh | H02M 7/53875 318/729 |
| 2018/0337600 A1* | 11/2018 | Neumayr | H02M 1/08 |
| 2019/0165713 A1* | 5/2019 | Namuduri | H02M 7/537 |

OTHER PUBLICATIONS

Schäfer Markus et al: "Multilevel direct current for grid-connected inverters", 2015 17th European Conference on Power Electronics and Applications (EPS'15 ECCE-Europe), Jointly Owned by EPE Association and IEEE PELS, pp. 1-7, XP032800130, DOI: 10.1109/EPE.2015.7309127, gefunden am Oct. 27, 2015, p. 2; 2015.

Ackva Ansgar et al: "Novel line-side inverter with active filter option: Two paralleled inverters with high speed direct current control algorithms", 2013 4th IEEE International Symposium on Power Electronics for Distributed Generations Systems (PEDG), IEEE, pp. 1-6, XP032586205, DOI: 10.1109/PEDG.2013.6785635, gefunden am Apr. 9, 2014, pp. 1-6; figure 1-3, paragraph 00II; 2013.

PCT International Preliminary Examination Report and Written Opinion of International Examination Authority dated May 2, 2019 corresponding to PCT International Application N. PCT/EP2017/076540 filed Nov. 24, 2016.

* cited by examiner

REGULATION OF AN OUTPUT CURRENT OF A CONVERTER

CROSS-REFERENCES TO RELATED APPLICATIONS

This application is the U.S. National Stage of International Application No. PCT/EP2017/076540, filed Oct. 18, 2017, which designated the United States and has been published as International Publication No. WO 2018/095659 and which claims the priority of European Patent Application, Serial No. 16200539.1, filed Nov. 24, 2016, pursuant to 35 U.S.C. 119(a)-(d).

BACKGROUND OF THE INVENTION

The invention relates to a closed-loop control of an output current of a power converter that comprises a DC voltage intermediate circuit and semiconductor switches in a bridge circuit for converting a DC voltage of the DC voltage intermediate circuit.

Two different methods may be used for the closed-loop control of an output current of a power converter of this type. A so-called indirect closed-loop current control is used most frequently. In this case, a current controller is used to calculate an output voltage that is then generated in accordance with a pulse width modulation method. Alternatively, a so-called direct closed-loop current control is used. In this case, the next output state of the power converter is determined directly by means of evaluating the actual current, in other words the pulse pattern of the closed-loop current control is derived directly from a current error.

The object of the invention is to specify an improved method for the closed-loop control of an output current of a power converter and to specify a power converter that renders it possible to use said method.

SUMMARY OF THE INVENTION

According to one aspect of the invention, the object is achieved by a method for the closed-loop control of an output current of a power converter that comprises a DC voltage Intermediate circuit and semiconductor switches in a bridge circuit for converting a DC voltage of the DC voltage intermediate circuit, wherein the output current is closed-loop controlled by means of a direct hysteresis closed-loop current control and during said control procedure an actual value of the output current is kept within a hysteresis window about a set point. In this case, a hysteresis width of the hysteresis window is modulated in order to set a frequency spectrum of the output current.

Hysteresis control is understood to be a closed-loop control in which the controlled variable is kept in a tolerance range about a set point. The tolerance range is described here as a hysteresis window, a width of the tolerance range is described as a hysteresis width.

The invention combines a direct hysteresis closed-loop current control of an output current of a power converter with a procedure of modulating the hysteresis width. Compared with an indirect closed-loop current control based on pulse width modulation, a direct closed-loop current control renders it advantageously possible to achieve a higher dynamic performance and robustness, by way of example with respect to changes in parameters of the closed-loop controlled system since in the case of an indirect closed-loop control that is based on pulse width modulation it is necessary to calculate in advance the pulse patterns of the pulse width modulation that are used within the pulse periods. The invention exploits the fact that when a direct hysteresis closed-loop current control of the output current is used, it is possible for the switching frequency of a power converter to be influenced as a result of the change of a hysteresis width of the hysteresis closed-loop current control. In turn, it is possible for the frequency spectrum of the output current to be changed as a result of influencing on the switching frequency. This renders it possible to set a frequency spectrum of the output current by means of modulating the hysteresis width of the direct hysteresis closed-loop current control. By way of example, it is advantageously possible as a consequence to reduce or avoid the excitation of resonance frequencies in the entire system comprising a power converter and a load. Moreover, it is possible to shift undesired harmonic components of the output current purposefully into frequency ranges in which said harmonic components are attenuated to a greater extent by the system or in which said harmonic components are not critical. If the power converter is connected to a load that is by way of example a motor or an inductance, it is furthermore possible to suppress interference noises that are often generated by a load of this type in that the frequency spectrum is adjusted to suit the acoustic sensitivity of the human ear.

One embodiment of the invention provides that the modulation of the hysteresis width is calculated in advance for different operating points of the power converter and is set during operation of the power converter in dependence upon operating points in accordance with the calculation that has been performed in advance. This embodiment of the invention renders it possible to modulate the hysteresis width in dependence upon the operating point with a small calculating outlay during operation of the power converter since the modulation of the hysteresis width is calculated in advance.

One embodiment of the invention that is an alternative to the above mentioned embodiment provides that the modulation of the hysteresis width is calculated during operation of the power converter in dependence upon a prevailing operating point of the power converter. Although this embodiment of the invention requires a greater calculating outlay during operation of the power converter for modulating the hysteresis width, it does however render it possible for the modulation of the hysteresis width to be flexibly adjusted even to suit operating points that have not been anticipated and therefore not calculated in advance.

One embodiment of the invention that is an alternative to the two above mentioned embodiments provides that the hysteresis width is closed-loop controlled during operation of the power converter. This embodiment of the invention renders it possible to perform a desired modulation of the hysteresis width even without the precise knowledge of the prevailing operating point of the power converter and its parameter.

A further embodiment of the invention relates to a power converter that is connected to a power line filter. This embodiment of the invention provides that the hysteresis width is modulated in dependence upon an amplitude response of the power line filter. By way of example, the hysteresis width is modulated in such a manner that a harmonic component of the output current is shifted from a first frequency range into a second frequency range in which the power line filter performs a greater attenuating process than in the first frequency range. This embodiment of the invention renders it advantageously possible to adjust the frequency spectrum of the output current to suit a power line filter and its amplitude response. By way of example, it is possible to adjust new variants of power converters in an optimum manner to suit existing power line filters with the result that it is possible to continue to use power line filters that are already available. Moreover, it is possible to minimize system perturbations of an entire system comprising already existing power converters and power line filters. Furthermore, it is possible to optimize the frequency spectrum of a power converter and a power line filter as one unit. This advantageously increases the optimization possibilities when designing the power line filter. It is also advantageously possible to use a conventional power converter by means of a power converter having a direct hysteresis closed-loop current control while still using an existing power line filter.

A further embodiment of the invention provides that a so-called SDHC closed-loop current control is used as a hysteresis closed-loop current control. SDHC closed-loop current control (SDHC=switched diamond hysteresis control) is understood to be a closed-loop current control method that was published in H. Weißmann, Hochdynamisches direktes Stromregelverfahren für Pulswechselrichter im Vergleich zu PWM-Verfahren [High-dynamic Direct Current Control Method for Pulse-controlled Power Inverters in comparison to PWM-methods] ISBN 978-3843904759, publisher Dr. Hut 2012. In the case of an SDHC method, at any point in time four adjacent space vectors are used for the closed-loop current control of a power convertor, the peaks of said vectors forming a rhombus. The SDHC method advantageously combines the high dynamic performance and robustness of a direct hysteresis closed-loop current control with the extraordinary stationary behavior of a space vector-modulated converter.

According to another aspect of the invention, the object is achieved by a power converter which includes a DC voltage intermediate circuit, semiconductor switches, a hysteresis controller and a modulation unit. The DC voltage intermediate circuit comprises a high potential bus and a low potential bus and a DC voltage is applied between the two. The semiconductor switches are connected in a bridge circuit between the high potential bus and the low potential bus for converting the DC voltage. The hysteresis controller is configured for the direct hysteresis closed-loop current control of an output current of the power converter and during said control procedure an actual value of the output current is kept within a hysteresis window about a set point. The modulation unit is configured for modulating a hysteresis width of a hysteresis window. A power converter of this type renders possible the closed-loop current control in accordance with the method according to the invention. The advantages of the power converter therefore arise from the above mentioned advantages of the method according to the invention.

Embodiments of the power converter provide that the bridge circuit comprises a two level topology or a multi-level topology, and/or that the power converter is configured as a single phase or multi-phase power inverter or as a DC-DC converter. These embodiments render it possible to use the method according to the invention for different types of power converters.

A further embodiment of the power converter provides that the modulation unit comprises a control unit for storing modulation patterns, which have been calculated in advance and are dependent upon the operating point, for modulating the hysteresis width and for controlling the hysteresis width during operation of the power converter in accordance with a modulation pattern that has been calculated in advance and is dependent upon the operating point.

One embodiment of the power converter that is an alternative to the above mentioned embodiment provides that the modulation unit comprises a control unit for calculating the modulation of the hysteresis width in dependence upon a prevailing operating point of the power converter during operation and for controlling the hysteresis width in accordance with the calculated modulation.

One embodiment of the power converter that is an alternative to the two above mentioned embodiments provides that the modulation unit comprises a closed-loop control unit for the closed-loop control of the hysteresis width.

The above mentioned respective alternative embodiments of the power converters correspond to the already above mentioned embodiments of the method according to the invention with the advantages already mentioned there.

BRIEF DESCRIPTION OF THE DRAWING

The above described characteristics, features and advantages of this Invention and also the manner in which these are achieved are clearer and more easily understood in conjunction with the following description of exemplary embodiments that are explained in detail in conjunction with the drawings. In the drawings.

DETAILED DESCRIPTION OF PREFERRED EMBODIMENTS

Figure 1:
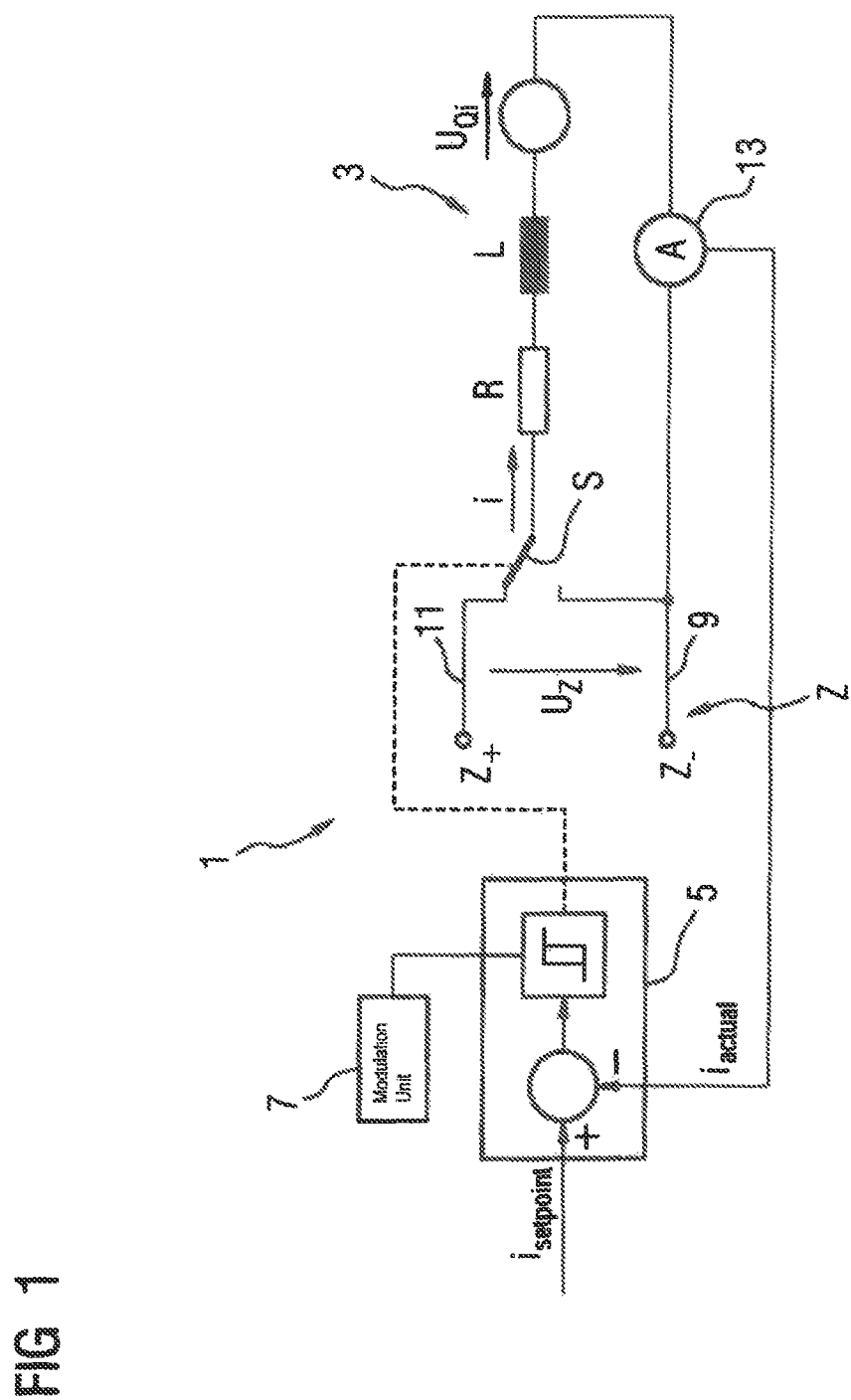
FIG. 1 shows an equivalent circuit diagram of a first exemplary embodiment of a power converter.

Mutually corresponding parts are provided with identical reference numerals in all figures.

FIG. 1 illustrates an equivalent circuit diagram of a first exemplary embodiment of a power converter 1 with a load 3 connected to said power converter. The power converter 1 comprises a DC voltage intermediate circuit Z, a switch S, a hysteresis controller 5 and a modulation unit 7.

The DC voltage intermediate circuit Z comprises a low potential bus 9 that is at a low potential $Z_-$, and a high potential bus 11 that is at a high potential $Z_+$. The DC voltage intermediate circuit Z provides a DC voltage $U_Z$ that is the difference between the high potential $Z_+$ and the low potential $Z_-$.

The switch S comprises a first switching state that switches an output of the switch S to the high potential $Z_+$, and a second switching state that switches the output of the switch S to the low potential $Z_-$. The switch S is achieved by way of example in a similar manner to FIG. 10 by means of two semiconductor switches 17 that are connected to form a half-bridge 15.

The load 3 is represented in the equivalent circuit diagram as an ohmic resistance R and an inductance L having a counter voltage $U_{Qi}$.

The hysteresis controller 5 is used to control an output current i of the power converter 1 by means of a direct hysteresis closed-loop current control with the result that an actual value $i_{actual}$ of the output current i is kept within a hysteresis window about a set point $i_{setpoint}$. The actual value $i_{actual}$ of the output current i is ascertained by means of a current measuring device 13 and supplied to the hysteresis controller S. The hysteresis controller 5 controls the switch S with the result that the actual value $i_{actual}$ of the output current i is returned to the hysteresis window if it leaves said hysteresis window.

The modulation unit 7 is used to modulate a hysteresis width W of the hysteresis window in order to set a frequency spectrum of the output current i.

Figure 2:
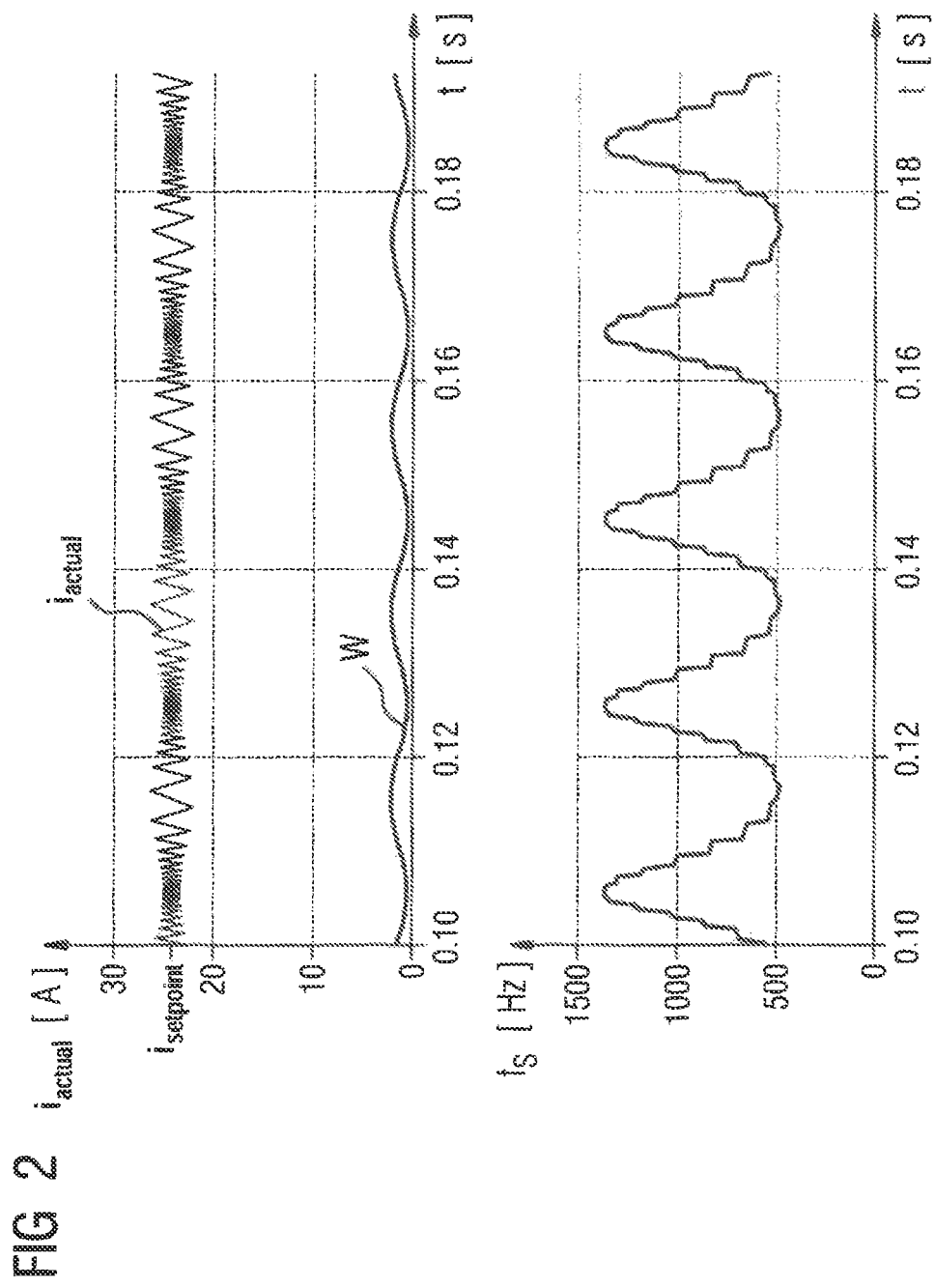
FIG. 2 shows first progressions of an output current and a switching frequency of a power converter.

FIG. 2 illustrates first progressions of an actual value $i_{actual}$ of the output current i of the power converter 1 illustrated in FIG. 1 and of a switching frequency $f_s$ of the switch S in dependence upon time t for a constant counter voltage $U_{Qi}$ and a constant set point $i_{setpoint}$ of the output current i of 25 A, wherein the hysteresis width W of the hysteresis window is modulated in a sinusoidal manner. The hysteresis window lies in a symmetrical manner about the set point $i_{setpoint}$ and the hysteresis width W is defined in this case as a distance between the upper limit of the hysteresis window and the set point $i_{setpoint}$ with the result that the hysteresis window is twice the width of the hysteresis width W. The switching frequency $f_s$ changes according to the modulation of the hysteresis width W, wherein the switching frequency $f_s$ depends upon the hysteresis width W in a non-linear manner. If the hysteresis width W is not modulated, a fixed stationary switching frequency $f_s$ would be set following a transient response.

Figure 3:
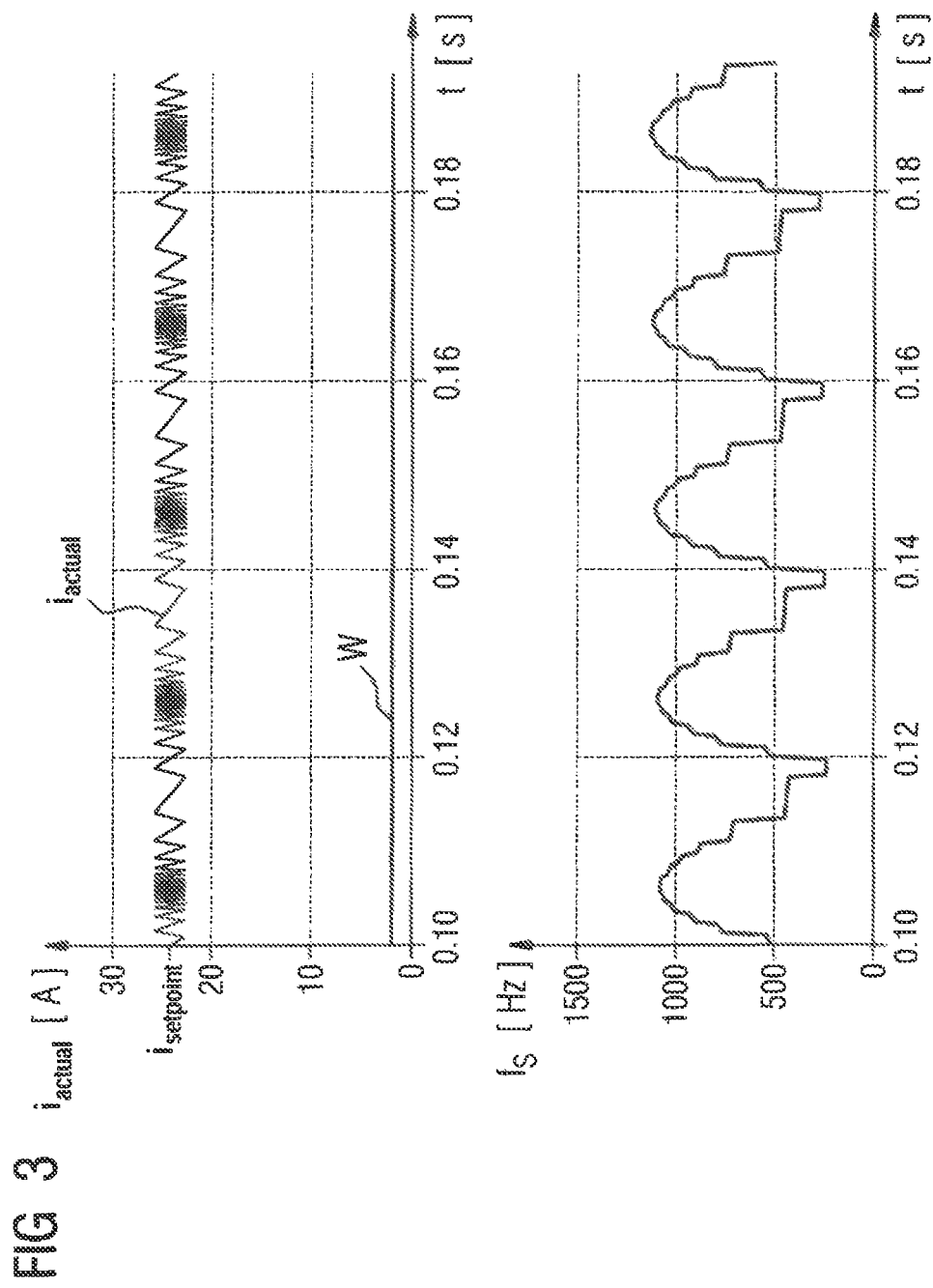
FIG. 3 shows second progressions of an output current and a switching frequency of a power converter.

FIG. 3 illustrates second temporal progressions of an actual value $i_{actual}$ of the output current i of the power converter 1 illustrated in FIG. 1 and of the switching frequency $f_s$ of the switch S for a sinusoidal counter voltage $U_{Qi}$ at a frequency of 50 Hz and a constant set point $i_{setpoint}$ of the output current i of 25 A, wherein the hysteresis width W of the hysteresis window is not modulated. The temporal change of the counter voltage $U_{Qi}$ causes a corresponding temporal change of the switching frequency $f_s$.

Figure 4:
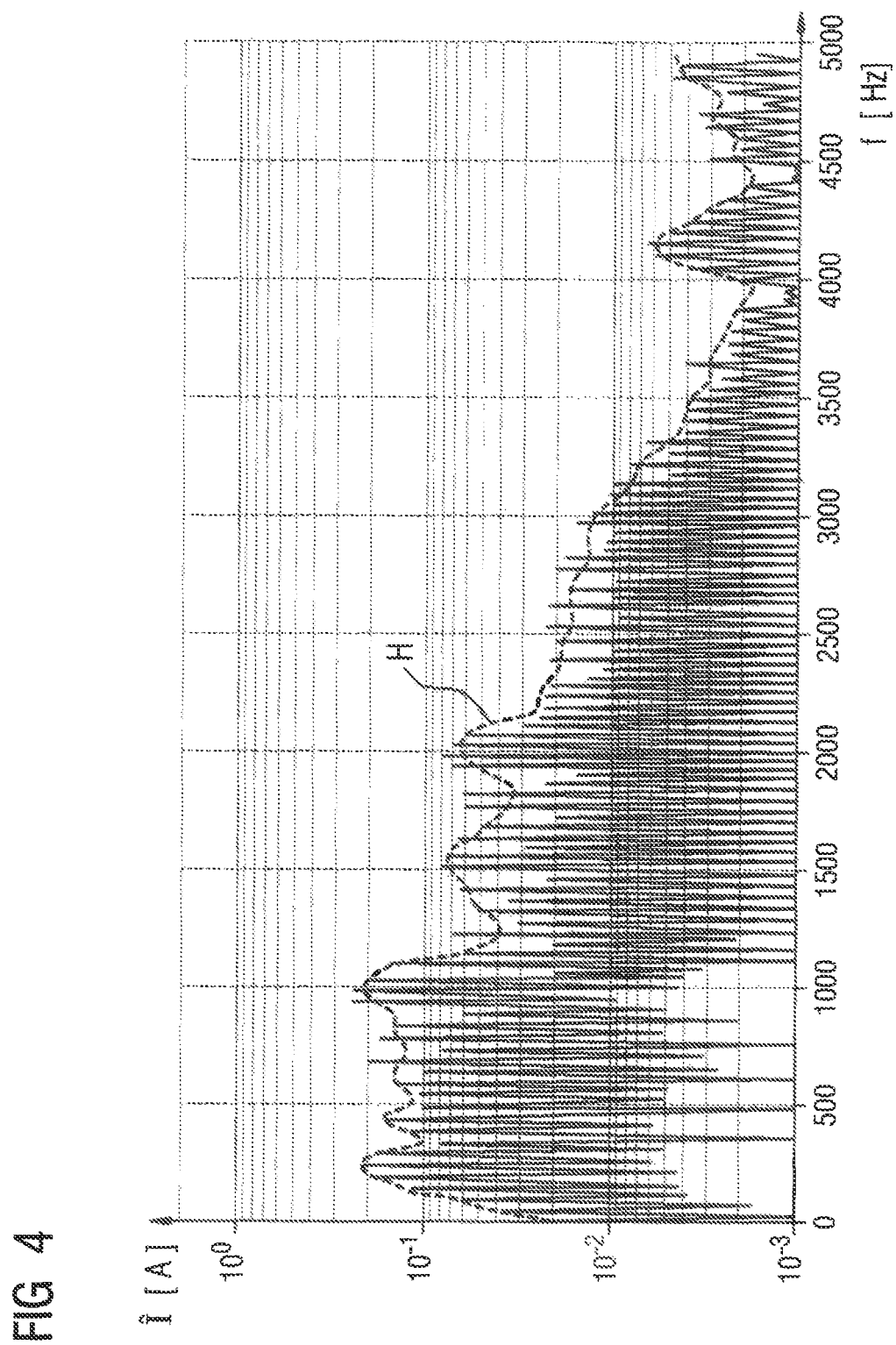
FIG. 4 shows a first amplitude spectrum of an output current of a power converter.

FIG. 4 illustrates a first amplitude spectrum $\hat{I}(f)$ of an amplitude $\hat{I}$ of the output current i, said amplitude spectrum arising from the temporal progressions of the output current i and of the switching frequency $f_s$ illustrated in FIG. 3, in dependence upon a frequency f. The amplitude spectrum $\hat{I}(f)$ comprises as a consequence of the temporal change of the switching frequency $f_s$ a distribution of the amplitudes $\hat{I}$ over a large frequency range with the result that a smoothed envelope curve H of the amplitude spectrum $\hat{I}(f)$ does not have any zero points over a wide range.

Figure 5:
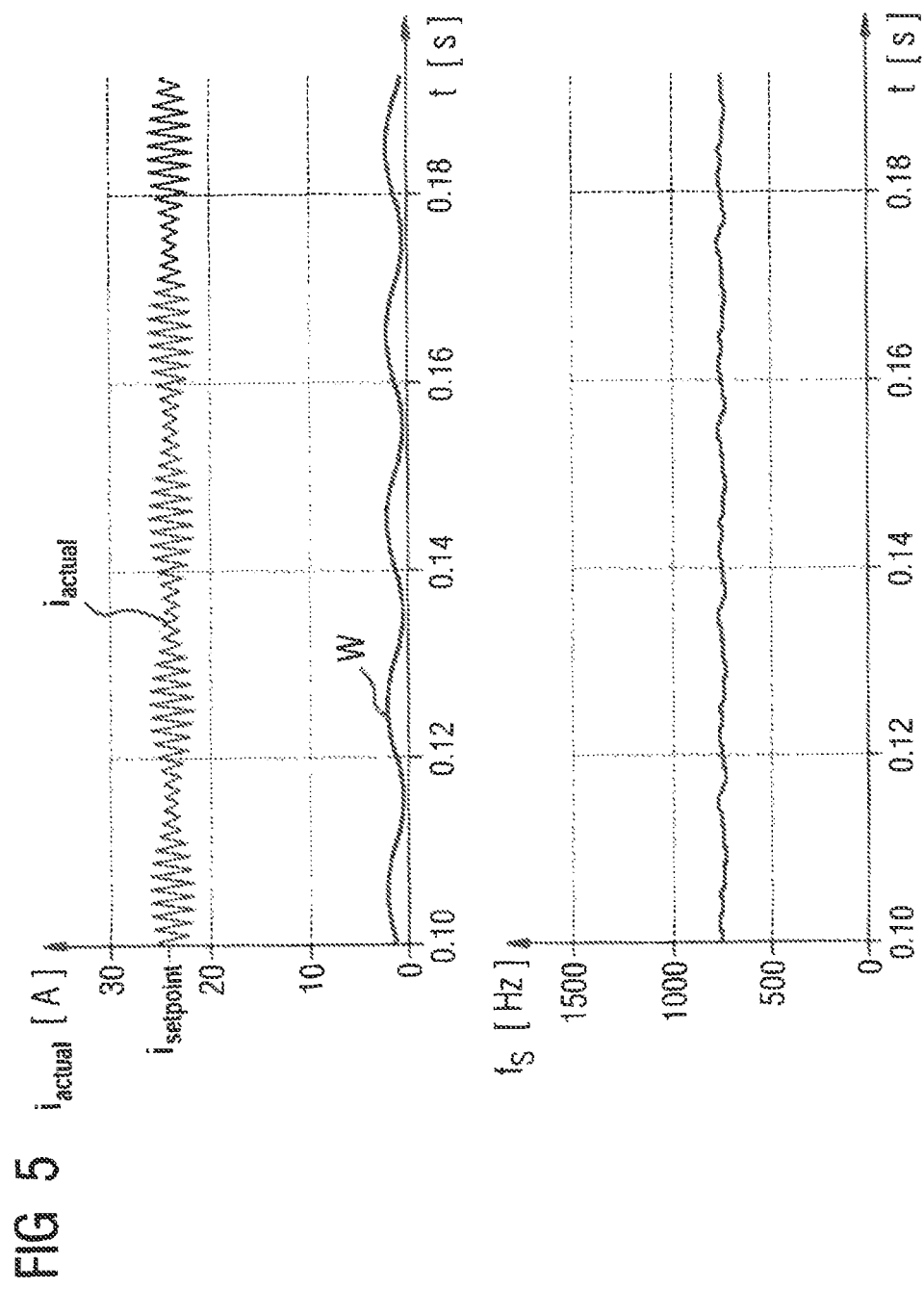
FIG. 5 shows third progressions of an output current and a switching frequency of a power converter.

FIG. 5 illustrates third temporal progressions of an actual value $i_{actual}$ of the output current i of the power converter 1 illustrated in FIG. 1 and of the switching frequency $f_s$ of the switch S for a sinusoidal counter voltage $U_{Qi}$ at a frequency of 50 Hz and a constant set point $i_{setpoint}$ of the output current i of 25 A as in FIG. 3, wherein the hysteresis width W of the hysteresis window is modulated with the result that an almost constant switching frequency $f_s$ of the switch S of approx. 750 Hz is produced.

Figure 6:
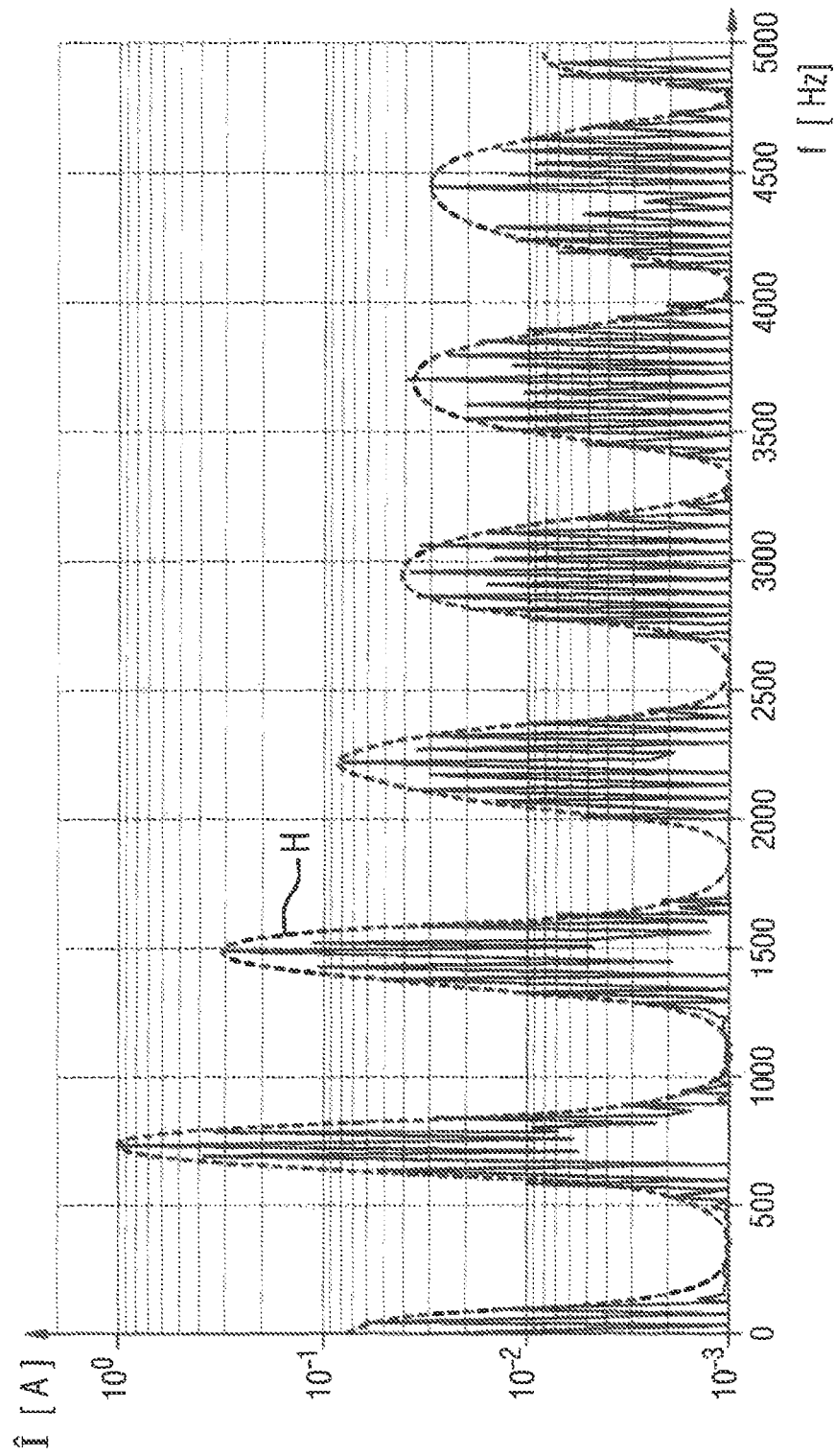
FIG. 6 shows a second amplitude spectrum of an output current of a power converter.

FIG. 6 illustrates a second amplitude spectrum $\hat{I}(f)$ of the amplitude $\hat{I}$ of the output current i, said amplitude spectrum arising from the temporal progressions of the output current i and the switching frequency $f_s$ illustrated in FIG. 5, in dependence upon a frequency f. In contrast to the first amplitude spectrum $\hat{I}(f)$ illustrated in FIG. 4, the second amplitude spectrum $\hat{I}(f)$ illustrated in FIG. 6 comprises a concentration of the amplitudes $\hat{I}$ on small frequency ranges that are arranged in each case about the almost constant switching frequency $f_s$ of the switch S of approx. 750 Hz or a multiple of this switching frequency $f_s$ with the result that the smoothed envelope curve H of the amplitude spectrum $\hat{I}(f)$ drops to zero between these frequency ranges. This demonstrates that it is possible by means of modulating the hysteresis width W of the hysteresis window to influence and set the frequency spectrum of the output current i of the power converter 1. In particular, the comparison of the amplitude spectra $\hat{I}(f)$ illustrated in FIGS. 4 and 6 demonstrates that it is possible by means of suitably modulating the hysteresis width W of the hysteresis window to concentrate harmonic components of the output current i of the power converter 1 on specific frequency ranges.

Figure 7:
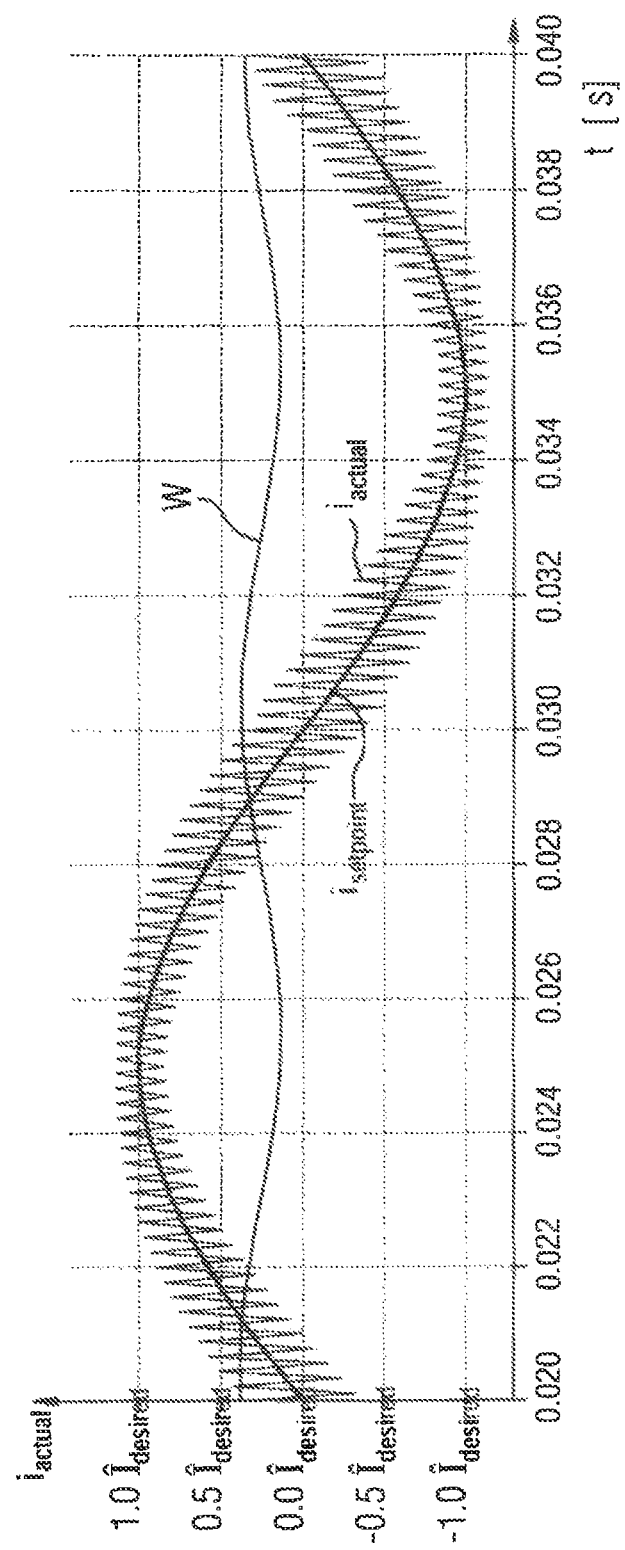
FIG. 7 shows a fourth progression of an output current of a power converter.

FIG. 7 illustrates a fourth temporal progression of an actual value $i_{actual}$ of the output current i of the power converter 1 illustrated in FIG. 1 for a sinusoidal counter voltage $U_{Qi}$ and a set point $i_{setpoint}$ of the output current i, said set point progressing in a sinusoidal manner at a frequency of 50 Hz and at a desired amplitude $\hat{I}_{desired}$, wherein the hysteresis width W of the hysteresis window is modulated in a sinusoidal manner at a frequency of 100 Hz with the result that the minima of the hysteresis width W are assumed at points in time at which the set point $i_{setpoint}$ of the output current i has extreme values.

Figure 8:
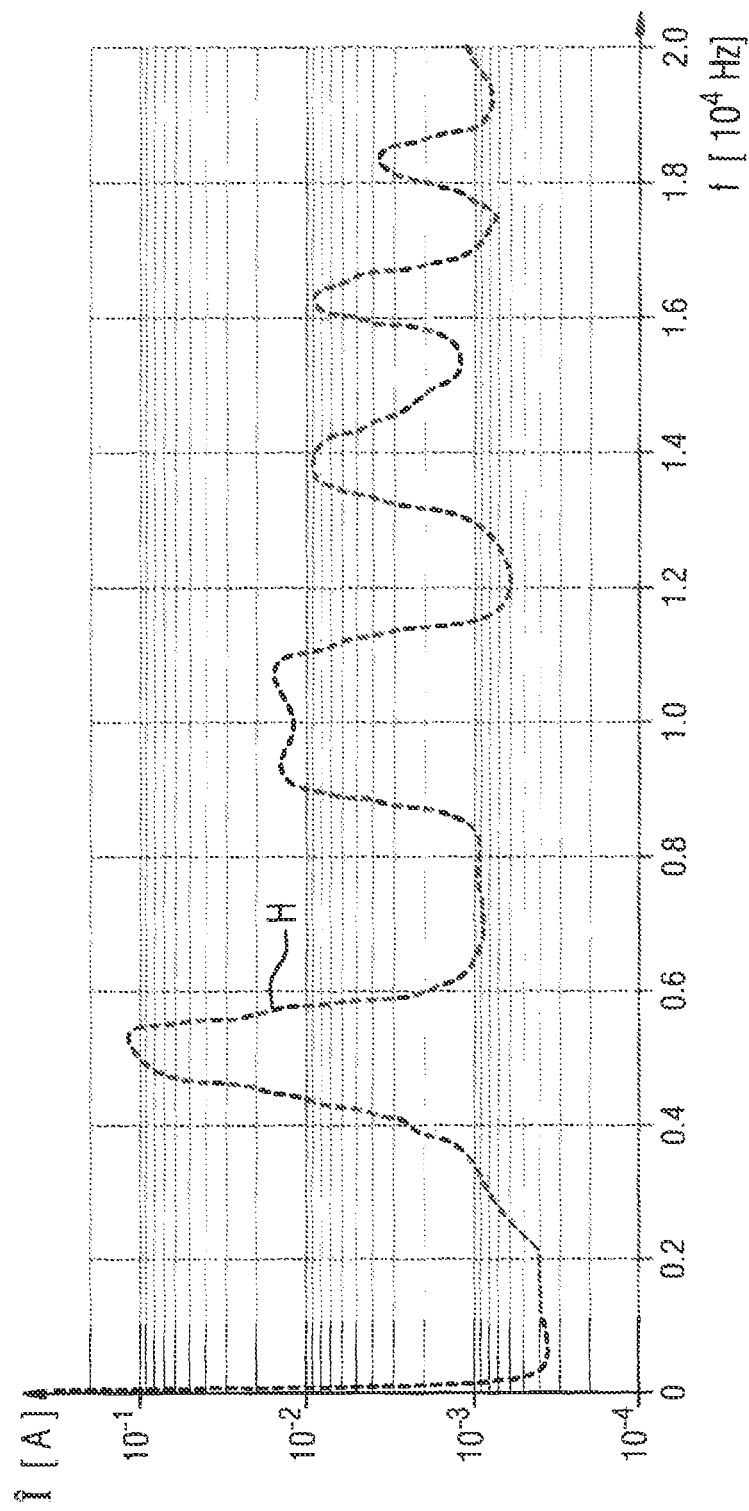
FIG. 8 shows a third amplitude spectrum of an output current of a power converter.

FIG. 8 illustrates a third amplitude spectrum $\hat{I}(f)$, which corresponds to FIG. 7, of the amplitude $\hat{I}$ of the output current i in dependence upon the frequency f, wherein only the envelope curve H of the amplitude spectrum $\hat{I}(f)$ is illustrated. By virtue of modulating the hysteresis width W, harmonic components of the output current i are concentrated similar to FIG. 6 on relatively small frequency ranges. The amplitude spectrum $\hat{I}(f)$ comprises a maximum at the frequency of 50 Hz of the set point $i_{setpoint}$.

Figure 9:
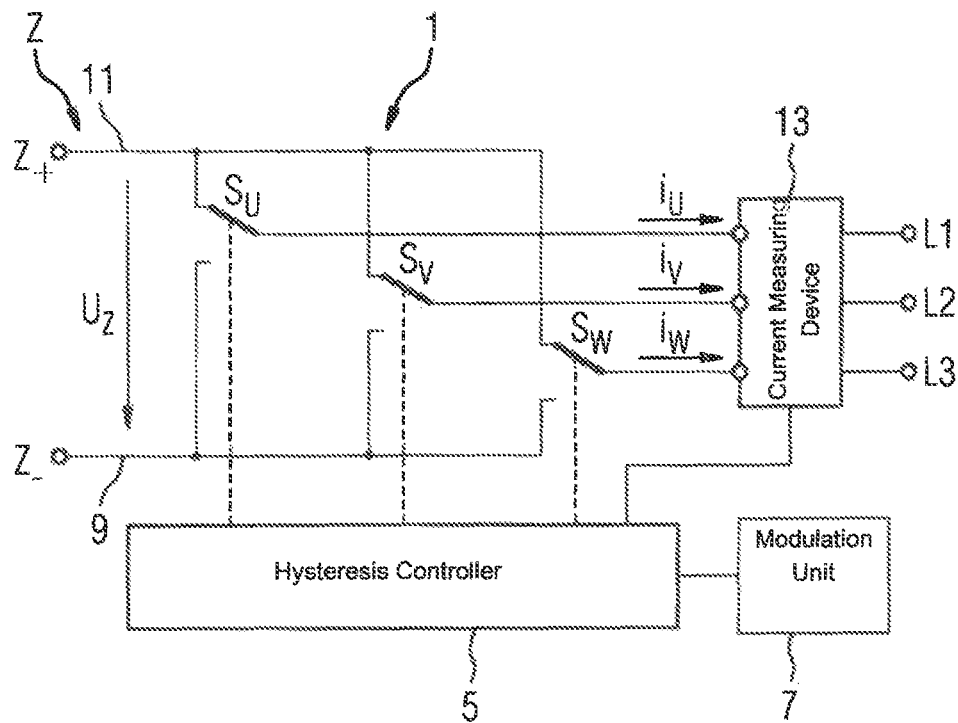
FIG. 9 shows an equivalent circuit diagram of a second exemplary embodiment of a power converter.
Figure 10:
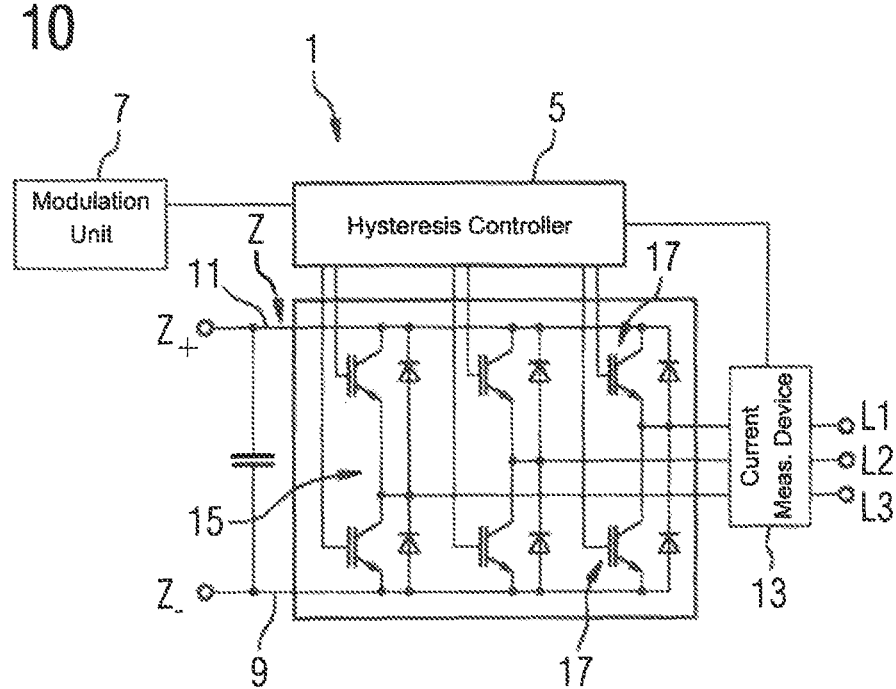
FIG. 10 shows a circuit diagram of the second exemplary embodiment of a power converter.

FIGS. 9 and 10 illustrate a second exemplary embodiment of a power converter 1. In this case, FIG. 9 illustrates an equivalent circuit diagram and FIG. 10 illustrates a circuit diagram of the power converter 1. The power converter 1 is a three-phase power inverter that comprises a DC voltage intermediate circuit Z, for each phase a switch $S_u$, $S_v$, $S_w$ and also a hysteresis controller 5 and a modulation unit 7.

As in the case of the exemplary embodiment illustrated in FIG. 1, the DC voltage intermediate circuit Z comprises a low potential bus 9 that is at a low potential $Z_-$, and a high potential bus 11 that is at a high potential $Z_+$ and provides a DC voltage $U_Z$ that is the difference between the high potential $Z_+$ and the low potential $Z_-$.

Each switch $S_u$, $S_v$, $S_w$ comprises a first switching state that switches an output of the switch $S_u$, $S_v$, $S_w$ to the high potential $Z_+$ and a second switching state that switches the output of the switch S to the low potential $Z_-$ and is connected to a connection terminal L1, L2, L3 of the respective phase of the power converter 1. Each switch $S_u$, $S_v$, $S_w$ is formed by means of two semiconductor switches 17 that are connected to form a half-bridge 15. Each semiconductor switch 17 is by way of example configured as a bipolar transistor having an insulated gate electrode (IGBT=insulated-gate bipolar transistor) and an antiparallel switched diode.

The hysteresis controller 5 is used to control the output currents $i_u$, $i_v$, $i_w$ of the phases of the power converter 1 by means of a direct hysteresis closed-loop current control. It is preferred that a SDHC closed-loop current control is used as the hysteresis closed-loop current control. For this purpose, the output currents $i_u$, $i_v$, $i_w$ of the power converter 1 are measured by means of a current measuring device 13. An actual current space vector is formed from the measured output currents $i_u$, $i_v$, $i_w$ by the hysteresis controller 5 in a stator-fixed complex coordinate system. The actual current space vector is kept within a hysteresis window about a desired current space vector by virtue of controlling the switches $S_u$, $S_v$, $S_w$ by means of the hysteresis controller 5, wherein in the case of the SDHC method at each point in time four adjacent voltage space vectors are used, the peaks of said vectors forming a rhombus, in order to determine the control of the switches $S_u$, $S_v$, $S_w$. Since the actual current space vector is a complex variable, the hysteresis window comprises respectively a hysteresis width W for the real portion and for the imaginary portion of the actual current space vector.

The modulation unit 7 is used to modulate the hysteresis widths W for the real part and for the imaginary part of the actual current space vector. It is possible by means of modulating these hysteresis widths W to influence the frequency spectra of the output currents $i_u$, $i_v$, $i_w$ in a similar manner to the procedure of influencing the frequency spectrum of an output current i of the power converter 1 that is illustrated in FIG. 1, said procedure of influencing said frequency spectrum being described above with reference to FIGS. 2 to 8. In particular, it is possible to concentrate harmonic components of the frequency spectrum on specific frequency ranges.

In the case of each of the exemplary embodiments of the invention described with reference to FIGS. 1 to 10, the modulation of the hysteresis width W is either calculated in advance for different operating points of the power converter 1 and set during operation of the power converter 1 in dependence upon an operating point in accordance with the calculation that has been performed in advance, or the modulation of the hysteresis width W is calculated during operation of the power converter 1 in dependence upon a prevailing operating point of the power converter 1, or the hysteresis width W is closed-loop controlled during operation of the power converter 1. The operating points of the power converter 1 are defined in this case at least by means of the output current i or rather the output currents $i_u$, $i_v$, $i_w$ and/or by means of a control factor of the desired output current or rather of the desired output currents with regard to the DC voltage $U_z$.

Rather than configuring the invention for power converters 1 illustrated in FIGS. 1, 9 and 10 that have a two level topology and whose switches S, $S_u$, $S_v$, $S_w$ comprise only two switching states, it is possible to configure the invention in a similar manner for power converters 1 that have a multi-level topology and whose switches S, $S_u$, $S_v$, $S_w$ comprise more than only two switching states. Moreover, the power converter 1 may comprise a neutral conductor connection and/or may be configured as a power inverter for a phase number that is different from one and three.

The modulation of the hysteresis width W of an output current i, $i_u$, $i_v$, $i_w$ of a power converter 1 may be used particularly advantageously in order to adjust the frequency spectrum of the output current i, $i_u$, $i_v$, $i_w$ to suit a power line filter 19 that is connected to the power converter 1.

Figure 11:
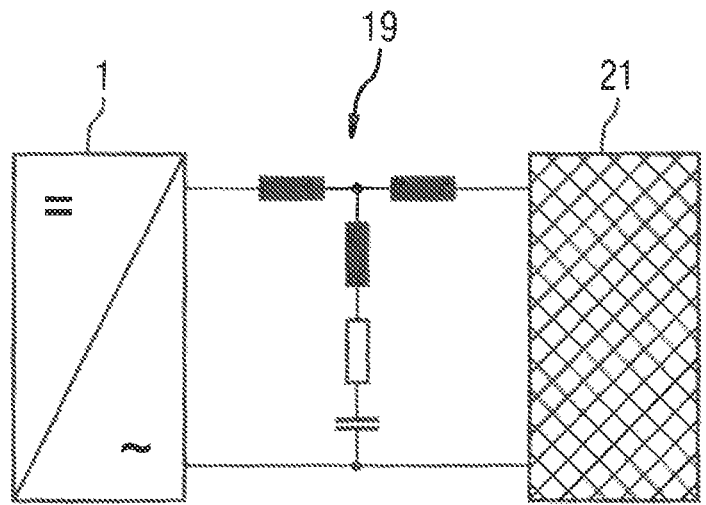
FIG. 11 shows a block diagram of a system that comprises a power converter, a power line filter and an electrical power system.

FIG. 11 illustrates a block diagram of a system that comprises a power converter 1, a power line filter 19 and an electrical power system 21. The power converter 1 is a power inverter that is connected to the electrical power system 21 via the power line filter 19. The power line filter 19 is configured by way of example as an inductor-type LCL filter with attenuation ability.

Figure 12:
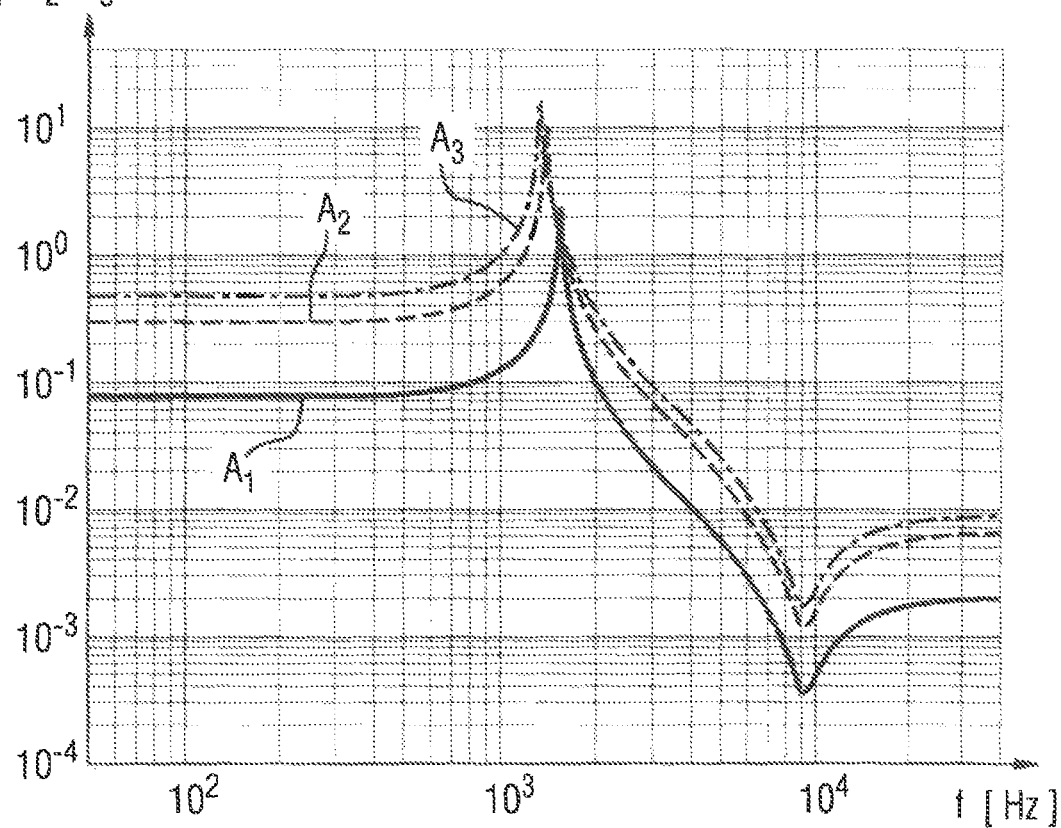
FIG. 12 shows amplitude responses of a power line filter.

FIG. 12 illustrates amplitude responses $A_1$, $A_2$, $A_3$ of the power line filter 19, illustrated in FIG. 11, for different power line inductances at a coupling point of the electrical power system 21 to the power line filter 19. The amplitude responses $A_1$, $A_2$, $A_3$ comprise in each case a distinct maximum attenuation in the case of a design frequency of approx. 9 kHz. By virtue of using power converters 1 of the type that is described above with reference to FIGS. 1 to 10 and that comprises direct hysteresis closed-loop current controls and hysteresis widths W of hysteresis windows that may be modulated for the output currents i, $i_u$, $i_v$, $i_w$ of the power converter 1, it is rendered advantageously possible by means of modulating the hysteresis widths W to concentrate harmonic components of the frequency spectra of the output currents i, $i_u$, $i_v$, $i_w$ on the frequency range about the design frequency at which the maximum attenuation occurs. As a consequence, the frequency spectra may be adjusted advantageously to suit the power line filter 19. In particular, a conventional power converter 1 may be advantageously replaced by means of power converter 1 that comprises a direct hysteresis closed-loop current control while still using an existing power line filter 19.

Although the invention has been further illustrated and described in detail by means of preferred exemplary embodiments, the invention is not limited by the disclosed examples and other variations may be derived therefrom by the person skilled in the art without abandoning the protective scope of the invention.

Advantageous embodiments of the invention are the subject matter of the dependent claims.

The invention claimed is:

1. A method for closed-loop control of an AC output current of a power converter which converts a DC voltage of a DC voltage intermediate circuit into the AC output current, comprising:
   controlling the AC output current by way of a direct hysteresis closed-loop current control, with an actual value of the AC output current being kept within a hysteresis window about a set point;
   setting a frequency spectrum of the AC output current by modulating a hysteresis width of the hysteresis window;
   calculating the modulation of the hysteresis width in advance for different operating points of the power converter; and
   setting the modulation during operation of the power converter commensurate with the calculation in dependence upon an operating point of the power converter.

2. The method of claim 1, wherein the modulation of the hysteresis width is calculated during operation of the power converter in dependence upon a current one of the operating points of the power converter.

3. The method of claim 1, further comprising controlling the hysteresis width during operation of the power converter.

4. The method of claim 1, wherein the hysteresis closed-loop current control is an SDHC (Switched Diamond Hysteresis Control) closed-loop current control.

5. The method of claim 1, wherein the DC voltage is converted into the AC output current by a bridge circuit having semiconductor switches.

6. A method for closed-loop control of an AC output current of a power converter which converts a DC voltage of a DC voltage intermediate circuit into the AC output current, comprising:
controlling the AC output current by way of a direct hysteresis closed-loop current control, with an actual value of the AC output current being kept within a hysteresis window about a set point;
setting a frequency spectrum of the AC output current by modulating a hysteresis width of the hysteresis window;
supplying the AC output current of the power converter to a power line filter, and
modulating the hysteresis width in dependence upon an amplitude response of the power line filter, wherein the hysteresis width is modulated such that a harmonic component of the AC output current is shifted from a first frequency range into a second frequency range, with the power line filter providing greater attenuation in the second frequency range than in the first frequency range.

7. The method of claim 6, wherein the hysteresis closed-loop current control is an SDHC (Switched Diamond Hysteresis Control) closed-loop current control.

8. The method of claim 6, wherein the DC voltage is converted into the AC output current by a bridge circuit having semiconductor switches.

9. A power converter, comprising:
a DC voltage Intermediate circuit having a high potential bus and a low potential bus and a DC voltage applied between the high potential bus the low potential bus,
a plurality of semiconductor switches connected between the high potential bus and the low potential bus in a bridge circuit and converting the DC voltage into an AC output current,
a hysteresis controller configured for direct hysteresis closed-loop current control of the AC output current and for keeping during said current control an actual value of the AC output current within a hysteresis window about a set point, and
a modulation unit configured for modulating a hysteresis width of the hysteresis window, said modulating unit comprising a control unit storing modulation patterns that have been calculated in advance and are dependent upon an operating point of the power converter, with the control unit modulating the hysteresis width and controlling the hysteresis width during operation of the power converter commensurate with one of the modulation patterns.

10. The power converter of claim 9, wherein the bridge circuit comprises a two level topology or a multi-level topology.

11. The power converter of claim 9, wherein the power converter is constructed as a single phase or multi-phase power inverter or as a DC-DC converter.

12. A power converter, comprising:
a DC voltage intermediate circuit having a high potential bus and a low potential bus and a DC voltage applied between the high potential bus the low potential bus,
a plurality of semiconductor switches connected between the high potential bus and the low potential bus in a bridge circuit and converting the DC voltage into an AC output current,
a hysteresis controller configured for direct hysteresis closed-loop current control of the AC output current and for keeping during said current control an actual value of the AC output current within a hysteresis window about a set point, and
a modulation unit configured for modulating a hysteresis width of the hysteresis window, said modulation unit comprising a control unit configured to calculate the modulation of the hysteresis width commensurate with an actual operating point of the power converter during operation and to control the hysteresis width commensurate with the calculated modulation.

13. The power converter of claim 12, wherein the bridge circuit comprises a two level topology or a multi-level topology.

14. The power converter of claim 12, wherein the power converter is constructed as a single phase or multi-phase power Inverter or as a DC-DC converter.

* * * * *